US012786885B2

(12) United States Patent
Michaelis et al.

(10) Patent No.: US 12,786,885 B2
(45) Date of Patent: Nov. 3, 2026

(54) COMMUNICATION SESSION SETUP PROCEDURE THAT ACCOUNTS FOR ENDPOINT BATTERY STATUS

(71) Applicant: Avaya Management L.P., Morristown, NJ (US)

(72) Inventors: Paul Roller Michaelis, Louisville, CO (US); Brad Black, Carp (CA); Sudhir Shelke, Pune (IN); Shailendra Pratap Singh, Pune (IN)

(73) Assignee: Avaya Management L.P., Morristown, NJ (US)

( * ) Notice: Subject to any disclaimer, the term of this patent is extended or adjusted under 35 U.S.C. 154(b) by 283 days.

(21) Appl. No.: 18/610,746

(22) Filed: Mar. 20, 2024

(65) Prior Publication Data

US 2024/0323854 A1 Sep. 26, 2024

Related U.S. Application Data

(60) Provisional application No. 63/491,191, filed on Mar. 20, 2023.

(51) Int. Cl.

| | |
|---|---|
| ***H04W 52/02*** | (2009.01) |
| ***H04L 65/1069*** | (2022.01) |
| ***H04L 65/1104*** | (2022.01) |
| ***H04L 65/756*** | (2022.01) |
| ***H04W 76/10*** | (2018.01) |

(52) U.S. Cl.

CPC ..... *H04W 52/0261* (2013.01); *H04L 65/1069* (2013.01); *H04L 65/1104* (2022.05); *H04L 65/756* (2022.05); *H04W 76/10* (2018.02)

(58) Field of Classification Search

CPC ............. H04W 52/0261; H04W 76/10; H04W 52/0277; H04L 65/1069; H04L 65/1104; H04L 65/756

See application file for complete search history.

(56) References Cited

U.S. PATENT DOCUMENTS

| | | | | |
|---|---|---|---|---|
| 9,247,410 B1 * | 1/2016 | Matsuo | ............. | H04M 1/72424 |
| 2002/0191698 A1 * | 12/2002 | Lee | ........................ | H04N 19/94 375/240.15 |
| 2009/0209300 A1 * | 8/2009 | Furbeck | ................ | H04M 1/253 455/574 |
| 2010/0020763 A1 * | 1/2010 | Ishizu | ................... | H04W 48/18 370/331 |
| 2011/0268000 A1 * | 11/2011 | Kashikar | ........... | H04W 52/0264 713/340 |
| 2012/0183040 A1 * | 7/2012 | Fang | ................ | H04N 21/42607 375/E7.026 |

(Continued)

*Primary Examiner* — Afshawn M Towfighi

(57) ABSTRACT

The technology disclosed herein enables consideration of battery status for an endpoint when configuring a codec for a communication session. In a particular example, a method provides, in an endpoint being powered by a battery, identifying a request to establish a communication session with the endpoint and determining a battery status of the battery. In response to determining the battery status satisfies a low-power criterion, the method provides selecting one or more parameters of a plurality of possible parameters for the communication session that result in lower power usage relative to non-selected parameters of the plurality of possible parameters and establishing the communication session using the one or more parameters.

19 Claims, 9 Drawing Sheets

100

(56) References Cited

U.S. PATENT DOCUMENTS

| | | | | |
|---|---|---|---|---|
| 2013/0058232 | A1* | 3/2013 | Wurm | H04N 19/164 370/252 |
| 2014/0095670 | A1* | 4/2014 | Ozgur | H04B 17/318 709/219 |

* cited by examiner

COMMUNICATION SESSION SETUP PROCEDURE THAT ACCOUNTS FOR ENDPOINT BATTERY STATUS

RELATED APPLICATIONS

This application is related to and claims priority to U.S. Provisional Patent Application No. 63/491,191, titled "COMMUNICATION SESSION SETUP PROCEDURE THAT ACCOUNTS FOR ENDPOINT BATTERY STATUS," filed Mar. 20, 2023, and which is hereby incorporated by reference in its entirety.

BACKGROUND

During initiation of a communication session, such as during a SIP call setup handshake, endpoints can offer many different protocols and codecs for the same media type. For example, a SIP audio call can connect with G.711, G.729, G.722, the IETF RFC-6716 "Opus" codec, and so on.

Many factors can influence which protocol or codec would be preferred when more than one is available. For example, the G.722 and G.722.2 audio codecs provide similar acoustic benefits (i.e., both support "wideband" audio, up to approximately 7 KHz, as opposed to the roughly 3.4 KHz upper limit of G.711 and G.729). An important difference is that the G.722 codec is computationally simpler than G.722.2, but it is also a bandwidth hog (up to 64 kbits/second vs 23.85 kbits/sec for equivalent quality G.722.2). G.722 is often the preferred wideband codec for wired SIP endpoints, where it can be beneficial to accept a higher kbit/sec transmission rate in exchange for decreased encoding/decoding complexity. Alternatively, when it's more important to conserve network bandwidth than it is to reduce the encoding/decoding complexity (as may be the case, for example, with mobile phones), G.722.2 is often the preferred codec.

Continuing to use the G.722 and G.722.2 codecs as illustrative examples, G.722.2 encoding/decoding consumes battery power more rapidly than G.722 because G.722.2 is computationally more complex. In another example, G.729 consumes battery power more rapidly than G.711 because G.729 is a compression codec utilizing Code Excited Linear Prediction, and is therefore computationally more complex than G.711, which is a comparatively simple Pulse Code Modulation technique.

SUMMARY

The technology disclosed herein enables consideration of battery status for an endpoint when configuring a codec for a communication session. In a particular example, a method provides, in an endpoint being powered by a battery, identifying a request to establish a communication session with the endpoint and determining a battery status of the battery. In response to determining the battery status satisfies a low-power criterion, the method provides selecting one or more parameters of a plurality of possible parameters for the communication session that result in lower power usage relative to non-selected parameters of the plurality of possible parameters and establishing the communication session using the one or more parameters.

In another example, an apparatus is provided having one or more computer readable storage media and one or more processing systems operatively coupled with the one or more computer readable storage media. Program instructions stored on the one or more computer readable storage media, when read and executed by the processing system, direct the apparatus to determine a battery level of a battery powering the apparatus and select one or more codecs for a communication session based on the battery level. The program instructions also direct the processing system to negotiate a session codec from the one or more codecs with other endpoints to the communication session and establish the communication session using the session codec on user communications exchanged over the communication session.

In a further example, one or more computer readable storage media are provided. The computer readable storage media has program instructions stored thereon that, when read and executed by a processing system, direct the processing system to receive a request from a user of a first endpoint to initiate a communication session with a second endpoint, determine a battery level of a battery powering the first endpoint, and select one or more codecs for the communication session based on the battery level. The program instructions also direct the processing system to use Session Initiation Protocol (SIP) to negotiate a session codec from the one or more codecs with other endpoints to the communication session and establish the communication session using the session codec on the user communications exchanged.

DETAILED DESCRIPTION

Figure 1:
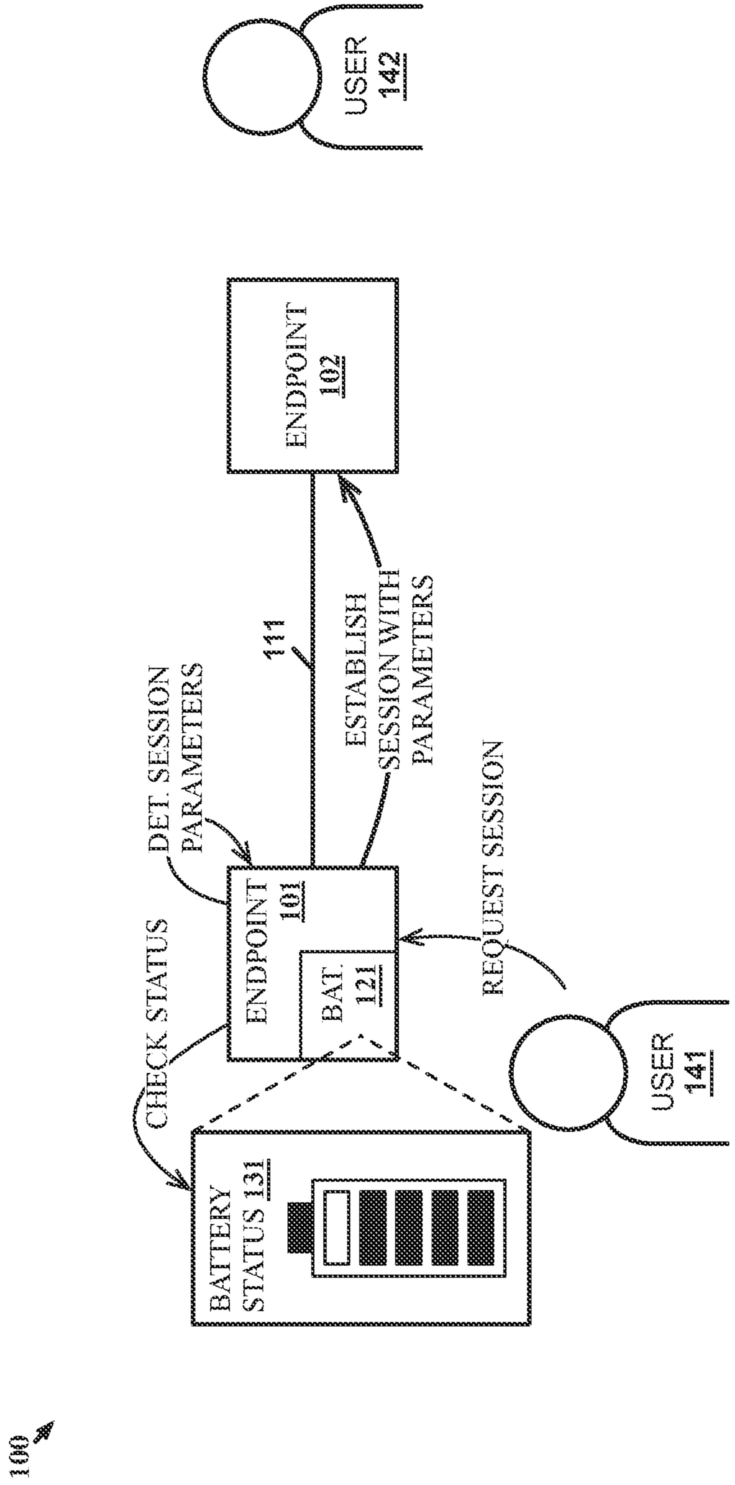
FIG. 1 illustrates an implementation for considering a battery status of an endpoint when configuring a communication session.

Session Initiation Protocol (SIP) plays a crucial role in initiating communication sessions by facilitating negotiation between endpoints to select a compatible codec. When a communication session is initiated, SIP begins by sending a SIP INVITE message from the calling party's endpoint to the called party. This message typically contains crucial information such as the caller's identity, the called party's network address, and the desired communication parameters, including the codecs supported by the caller. Upon receiving the SIP INVITE message, the called party's endpoint responds with a SIP 200 OK message, indicating that the request is accepted.

Simultaneously, within the SIP 200 OK message, the called party's endpoint communicates its supported codecs back to the calling party. The calling party's endpoint processes this information to identify a common codec supported by both endpoints. If there's a codec mismatch, SIP initiates negotiation mechanisms, typically through SIP messages like SDP (Session Description Protocol), to find a compromise. Once a mutually supported codec is agreed upon, SIP signals the endpoints to establish the communication session, ensuring that both parties can communicate effectively by encoding and decoding the audio or video streams using the selected codec. This negotiation process facilitated by SIP ensures seamless communication between diverse endpoints with varying codec capabilities.

More and more SIP endpoints are battery powered devices, such as laptops, tablet computers, smartphones, etc., but SIP does not currently account for battery life when selecting a codec. The amount of power used by an endpoint during a communication session differs depending on the codec used by the endpoint. For instance, some codecs place a higher computational load on the endpoint. An endpoint in the examples below determines a status the endpoint's battery and limits SIP to negotiating from codecs selected based on the battery status. As a generic example, codecs having lower power consumption may be selected for a communication session that may not otherwise be able to complete if a higher power consumption codec was used. Even if the higher power consumption codec is supported by all endpoints on the communication session, the endpoint will leave the higher power consumption codec out of the endpoint's available codecs during negotiation, preventing the higher power consumption codec from being selected for the communication session.

The endpoint may also consider parameters beyond codecs that impact the exchange of communications on a communication session. For instance, even after a codec is selected, configuration of the codec may affect the amount of power consumed when using that codec. Bitrate for audio/video communications, and resolution and framerate for video communications, may be configured to reduce the codecs power usage. Also, a connection to a communication network may be selected based on the battery status. One type of connection available to the endpoint may use more power than another type (e.g., the modem for one connection may use more power than the modem for another or a connection with a low signal strength may use more power that a connection with a higher signal strength). Other types of parameters may also be considered when establishing a communication session optimally use available battery power.

FIG. 1 illustrates implementation 100 for considering a battery status of an endpoint when configuring a communication session. Implementation 100 includes endpoint 101 and endpoint 102. Endpoint 101 is operated by user 141 and endpoint 102 is operated by user 142. Endpoint 101 and endpoint 102 communicate over communication link 111. Communication link 111 may be a direct link or may include intervening systems, networks, and/or devices.

Endpoint 101 is a computing system, such as a laptop, tablet computer, smartphone, etc., powered by battery 121. When battery 121 is empty, endpoint 101 may be plugged in or use wireless charging to receive external power to recharge battery 121. Endpoint 101 may also be able to operate while connected to external power. Endpoint 102 is also a computing system and may be powered by a battery, although, no battery is shown in implementation 100. Endpoint 101 and endpoint 102 establish a communication session over communication link 111. In this example, endpoint 101 and endpoint 102 communicate directly with one another. In other examples, an intervening system may facilitate the communication session between endpoint 101 and endpoint 102.

In this example, user 141 initiates the session request at endpoint 101 to call user 142. In other examples, user 142 may initiate the session at endpoint 102 and endpoint 101 may receive a session request from endpoint 102. Endpoint 101 checks battery status 131. Battery status 131 may indicate an amount of power remaining in battery 121 (e.g., a battery charge percentage), an amount of power capable of being provided by battery 121 (e.g., as batteries age and/or get low on charge, the amount of power provided by the battery may be reduced), battery temperature (e.g., battery temperature being too high may reduce the amount of power that can be provided), or some other type of status. Endpoint 101 determines which parameters should be offered for the communication session based on battery status 131. The parameters may include one or more codecs, one or more codec configurations (e.g., bitrates, framerates, resolutions, etc.), Endpoint 101 may determine the parameters based solely on battery status 131 or may use other information that may affect power usage from battery 121. For instance, endpoint 101 may determine its current location and/or a location to which endpoint 101 may be moving to determine a wireless communication link that should be used for the communication session. In another example, endpoint 101 may also estimate how long a communication session will last to estimate whether different parameter combinations will enable the communication session to complete prior to battery 121 running out of energy. In some examples, endpoint 101 may present the different parameter combinations to user 141 with estimates as to how long battery 121 will last. User 141 may select a parameter combination based on their own judgment regarding how long user 141's thinks they need battery 121 to last (e.g., just for the length of the communication session or long enough for activities afterwards) versus compromises of different parameter combinations (e.g., one combination may use a lower quality codec but a more costly wireless link).

Once the parameters are selected, endpoint 101 initiates the requested communication session using the parameters. In some examples, if conditions change during the course of the communication session, endpoint 101 may determine the new conditions warrant different parameters and may reconfigure the communication session to use the different parameters.

Figure 2:
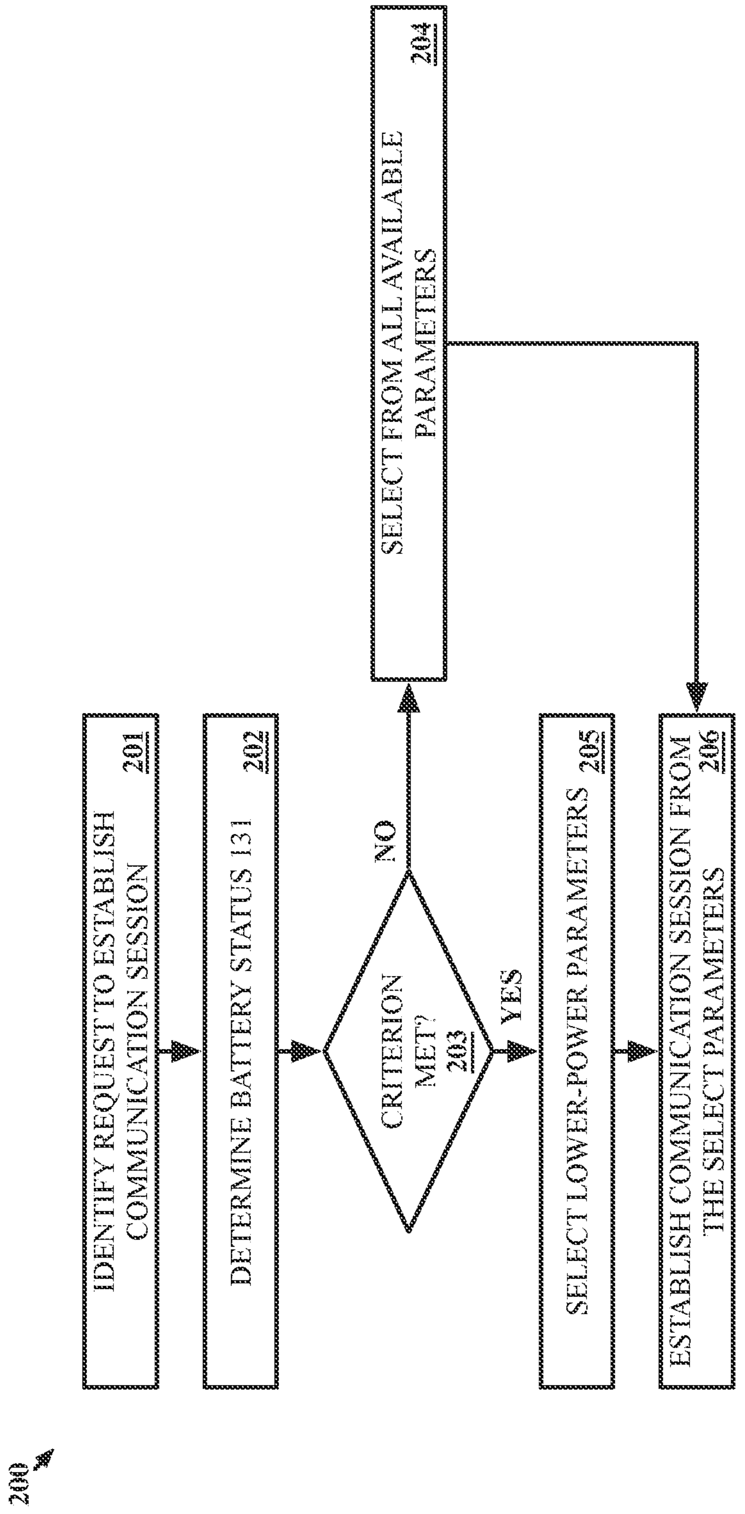
FIG. 2 illustrates an operation to consider a battery status of an endpoint when configuring a communication session.

FIG. 2 illustrates operation 200 to consider a battery status of an endpoint when configuring a communication session. In operation 200, endpoint 101 identifies a request to establish a communication session (step 201). Endpoint 101 may receive a user instruction from user 141 to initiate the communication session or may receive a communication session request, such as a SIP INVITE message or a message using some other protocol, from endpoint 102. The communication session may be a real-time audio or video call enabling user 141 and user 142 to speak with each other in real time. While each endpoint is only shown to have one user in this example, one or more of endpoints 101-102 may have multiple users. Similarly, while the communication session in this example is between two endpoints, the communication session in other examples may be between more than two endpoints. Endpoint 101 may execute a client application enabling user 141 to participate in communication sessions.

Endpoint 101 also determines battery status 131 of battery 121 (step 202). Endpoint 101 may determine battery status 131 after receiving the request to have the most up to date battery status information or endpoint 101 may regularly (e.g., periodically or continually) monitor battery status 131 such that battery status 131 is already known by endpoint 101 when the request is received. Battery status 131 may include an amount of energy remaining in battery 121, a charge level of battery 121 relative to full, a power output of battery 121, a temperature of battery 121, or some other type of information describing battery 121's condition.

Endpoint 101 analyzes battery status 131 to determine whether at least one low-power criterion is satisfied (step 203). In a simple example, the criterion may be a threshold battery charge level. In other examples, the criterion may be dynamic. For instance, rather than a static battery level threshold, the threshold may be dynamic depending on conditions for the communication session. The threshold may be adjusted to ensure proper parameters are selected given the characteristics of the communication session and the characteristics of battery status 131. For example, endpoint 101 may determine that the communication session is likely only going to last 15 minutes. The dynamic battery level threshold in that case may be much lower than had the communication session been estimated to last an hour (e.g., battery 121 at a low charge level may still be able to support a 15-minute call using a power-hungry codec but cannot support the same codec for a full hour). In some examples, the criterion may be defined by the call conditions themselves. Using the above session time example, endpoint 101 may estimate how long the session will last and then determine which parameter configurations will enable battery 121 to power endpoint 101 for the entire session. If all parameter configurations can power endpoint 101 until the estimated end time of the session, then endpoint 101 may consider the low-power condition to not be satisfied. If, however, not all configurations will last until the estimated end of the session, the criterion is satisfied and endpoint 101 will select one or more parameter configurations that will enable endpoint 101 to be powered by battery 121 until the end of the session. In examples where endpoint 101 is plugged into external power such that battery 121 is not currently responsible for powering endpoint 101, then endpoint 101 may consider the low-power criterion to not be met by default.

If the low-power criterion is not satisfied, endpoint 101 selects from all available parameters to configure the communication session (step 204). The parameters may include all supported codecs, codec configurations (e.g., bitrates, framerates, resolutions, etc.), wireless links, or other type of parameter that may affect the communication session. In other words, if the low-power criterion is not satisfied, then endpoint 101 establishes the communication session in the same manner endpoint 101 would if battery status 131 was not considered. While any protocol for initiating sessions may be used, if SIP is used by endpoint 101, this means endpoint 101 negotiates the codec to be used for the session with endpoint 102 as defined by the protocol without limitation.

If the low-power criterion is satisfied, endpoint 101 selects a subset of the available parameters (step 205). The parameter configurations included in the subset, if used by endpoint 101, will use less power from battery 121 than other potential parameter configurations not included in the subset. How much less power depends on the low-power criterion being triggered. For instance, with battery status 131 being equal in both cases, an estimated 30-minute session may result in different parameters being selected than would be selected for an estimated 15-minute session. That is, even if a criterion is met for both session lengths endpoint 101 may select even less power-hungry parameters (i.e., parameters that cause endpoint 101 to consumer more power) to power the 30-minute call verses those selected for the 15-minute call because the 30-minute call will need power for twice as long. In some examples, endpoint 101 may include a buffer in its calculations of which parameters to select. The buffer helps ensure battery 121 still has some charge left upon completion of the communication session (e.g., endpoint 101 may select parameters that allow 10% battery charge level to remain after the session concludes). Endpoint 101 may estimate the length of the session by accessing a calendar of user 141 on endpoint 101 to identify a scheduled amount of time for the communication session (assuming an entry exists in the calendar for the session), may reference call logs to determine how long sessions between user 141 and user 142 typically last, may request an estimated length from user 141, or may estimate the length based on some other information.

Different parameter configurations may be used to achieve the desired power-saving goals. For example, a codec with a higher computational load may still be included if the parameters also provide a lower framerate and/or resolution than a codec with a lower computational load. In another example, if a lower power wireless link can be used, then endpoint 101 may be able to select more power-hungry codecs and/or codec configuration parameters to use power freed up by the wireless link selection. Including both codecs may be beneficial to increase the chances that a supported codec can be agreed upon during establishment of the communication session. In some examples, endpoint 101 may present some or all parameter combinations to user 141 and enable user 141 to select a desired parameter combination. Endpoint 101 may present information, such as an estimated amount of time the battery will last, to aid user 141 when making their decision about which parameter configuration to select.

Once parameters are selected at either step 204 or step 205, endpoint 101 establishes the communication session using the selected parameters (step 206). How the parameters are used may depend on the protocol being used to establish the session. In one example, endpoint 101 may just configure the communication session under the assumption endpoint 102 can handle a communication session with the configured parameters (e.g., may use the highest quality parameters determined in the preceding steps) or may attempt establishment using different parameters until endpoint 102 accepts the parameters being used (e.g., may attempt successively lower quality parameters until parameters are accepted by endpoint 102). In other examples, endpoint 101 may negotiate with endpoint 102 on the parameters being used. For instance, using SIP, endpoint 101 may limit the codecs used in the negotiation to those identified at step 205 (or limits the codecs to all potential codecs supported by endpoint 101 if the criterion was not met). From the perspective of endpoint 102, endpoint 101 is simply providing the codecs that are compatible with endpoint 101. Endpoint 102 has no reason to know that the codecs offered by endpoint 101 are fewer than what endpoint 101 actually supports due to battery status 131. Establishing the communication session using the subset of codecs enables endpoint 101 to use less power from battery 121 for the communication session that may otherwise have occurred with all codecs being available. In some examples, endpoint 102 may similarly be battery powered and selecting parameters based on the status of endpoint 102's battery to limit what parameters are offered to endpoint 101.

Figure 3:
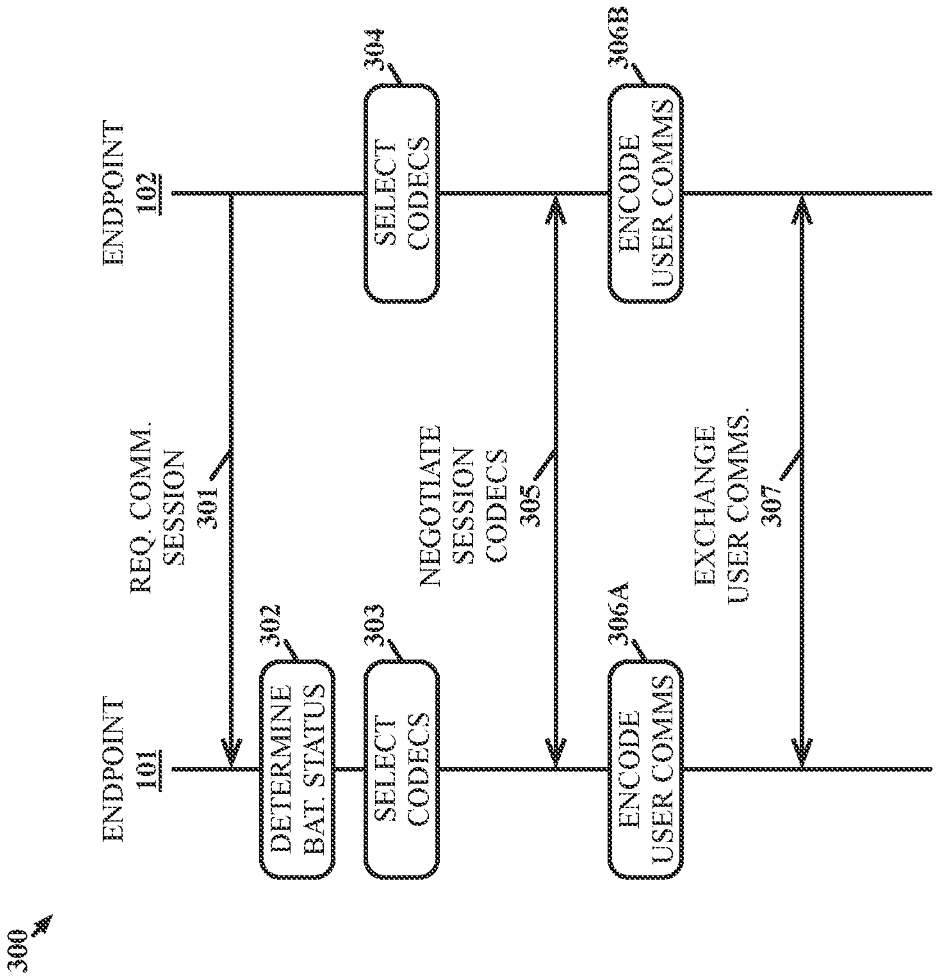
FIG. 3 illustrates an operational scenario for considering a battery status of an endpoint when configuring a communication session.

FIG. 3 illustrates operational scenario 300 for considering a battery status of an endpoint when configuring a communication session. In operational scenario 300, endpoint 102 requests a communication session with endpoint 101 (step 301). User 142 may trigger the request by interacting with a client application for the communication session executing on endpoint 102 or the request may be initiated in some other manner. If using SIP, the request may be a SIP INVITE message. Upon receiving the request, endpoint 101 determines battery status 131 (step 302). Battery status 131 may be determined from battery control circuitry, a battery control component of endpoint 101's operating system, one or more sensors in endpoint 101 (e.g., a temperature sensor, voltmeter, etc.), or from some other source. In this example, endpoint 101 selects codecs to be offered to endpoint 102 based on battery status 131 (step 303). If battery status 131 indicates codecs that consume less power should be used to handle the communication session, endpoint 101 does not select higher power consumption codecs. Endpoint 102 also selects codecs (step 304). If endpoint 102 is not performing similar to endpoint 101 by selecting codecs based on battery status, endpoint 102 may simply select all codecs endpoint 102 is capable of handling.

After selecting the codecs, endpoint 101 and endpoint 102 negotiate which codec will be used for the requested session (step 305). In the case of SIP, endpoint 101 may response to the SIP INVITE with a SIP 200 OK message. In the SIP 200 OK message, endpoint 101 may include the codecs endpoint 101 selected. Upon receiving the SIP 200 OK message, endpoint 102 may select a codec to use for the session that is included in both the SIP 200 OK message and the codecs endpoint 102 selected for itself. Endpoint 102 signals endpoint 101 to set up the session using the selected codec. In some examples, multiple codecs may be selected. For instance, a video call session may use one codec for audio and another codec for video. Once the communication is established, user communications can be exchanged over the established session. Endpoint 101 and endpoint 102 both capture user communications (e.g., voice and video) from their respective users, user 141 and user 142. The captured communications are encoded by the respective endpoints 101-102 (steps 306A and 306B) before being transmitted over the communication session (step 307).

Figure 4:
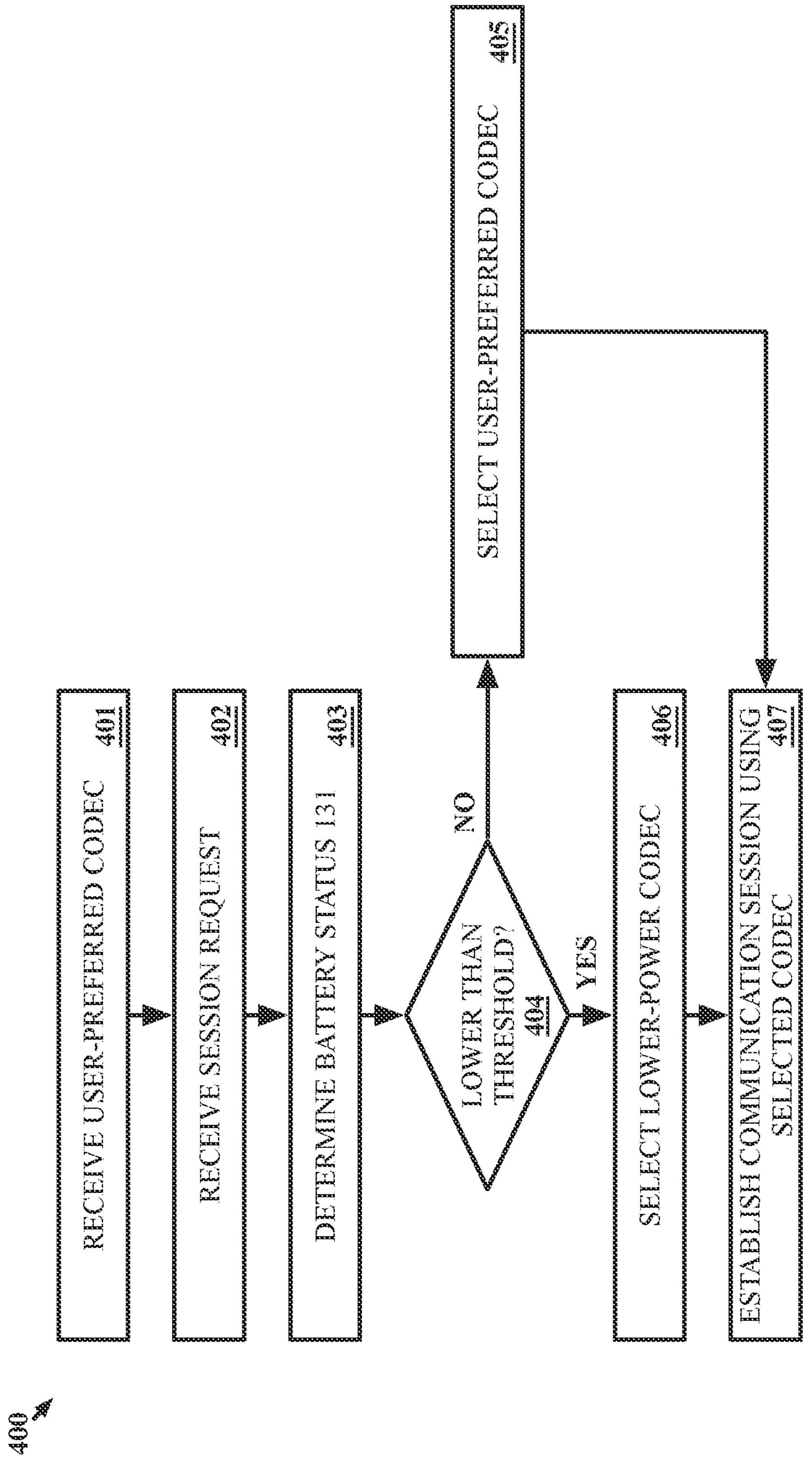
FIG. 4 illustrates an operation to consider a battery status of an endpoint when configuring a communication session.

FIG. 4 illustrates operation 400 to consider a battery status of an endpoint when configuring a communication session. In operation 400, endpoint 101 receives a user-preferred codec (step 401). The user-preferred codec may act as a default codec for communication sessions. The user-preferred codec may be a codec that user 141 prefers due to the perceived quality by user 141, may serve a purpose for computing systems (e.g., hard-of-hearing users may require a wideband audio codec like G.722 or G.722.2), or may be preferred by user 141 for some other reason.

At some point after setting the user-preferred codec, endpoint 101 receives a session request (step 402). The session request may be received from user 141 to initiate the communication session with endpoint 102 or may be a request received from endpoint 102. Like in operation 200, endpoint 101 determines battery status 131 (step 403). In this example, the criterion is a threshold battery charge level, which may be static or dynamic, as described above, and battery status 131 indicates the current battery charge level of endpoint 101. Endpoint 101 determines whether the battery charge level is below the threshold (step 404). If not, endpoint 101 selects the user-preferred codec (step 405). If the charge level is below the threshold, endpoint 101 selects a lower-power codec (i.e., a codec that will not drain battery 121 as fast as the user-preferred codec) (step 406). Using the hard-of-hearing example from above, the user-preferred codec may be G.722.2, which is more computationally complex than G.722. While both codecs are wideband, G.722 may be selected at step 406 because G.722 will use less power when encoding/decoding audio. G.722 may create an audio signal that uses more bandwidth than one generated by G.722.2 but that may be a tradeoff endpoint 101 is willing to make in the interest of conserving battery power.

Endpoint 101 establishes the communication session with endpoint 102 using the selected codec (step 407). In some examples, endpoint 101 may only offer the selected codec to endpoint 102 in hopes that the selected codec is supported by endpoint 102. In the hard-of-hearing example, endpoint 101 may not offer codecs other than G.722 and G.722.2 to ensure the communication session is suitable for hard-of-hearing users. In other examples, endpoint 101 may indicate a preference for a certain codec but may offer other selected codecs as well.

Figure 5:
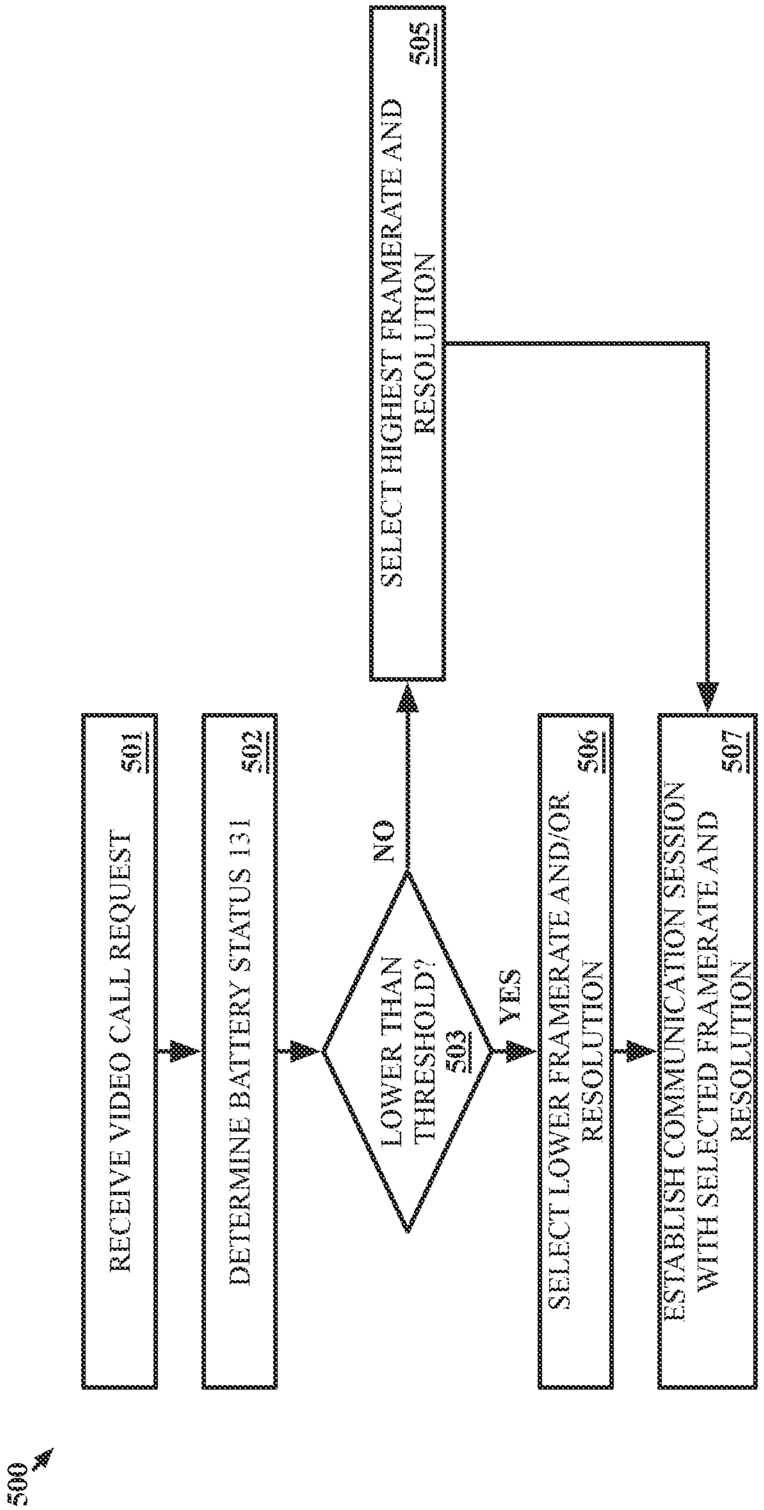
FIG. 5 illustrates an operation to consider a battery status of an endpoint when configuring a communication session.

FIG. 5 illustrates operation 500 to consider a battery status of an endpoint when configuring a communication session. Operation 500 is an example where endpoint 101 receives a video call request (step 501) and adjusts configuration of a video codec based on battery status 131. Again, the video call request may come from user 141 or may be a session request received from endpoint 102. Endpoint 101 determines battery status 131 (step 502) and, like in operation 400, determines whether the current battery charge level is below a threshold charge level (step 503). If the battery charge level is not below the threshold, endpoint 101 can select a highest possible framerate and/or resolution for the video encoded using the codec (step 505). Only framerate and resolution are discussed in this example but, in other examples, additional parameters may be considered, such a number of colors supported or bitrate. The highest possible resolution/framerate may be defined by the video codec, may be limited by hardware of endpoint 101 (e.g., screen/camera resolution), may be limited by bandwidth available on communication link 111, or may be defined in some other manner.

If endpoint 101 determines the current battery charge level is lower than the threshold, then endpoint 101 selects a lower framerate and/or resolution that would otherwise be allowed (step 506). Lowering the framerate or resolution typically reduces the computational load on endpoint 101 when encoding/decoding video. In some examples, endpoint 101 may first select a codec for the video based on battery status 131 and then, if necessary, further reduce the power consumed by the selected codec by limiting framerate and/or resolution parameters. Endpoint 101 establishes the communication session with the selected framerate and resolution (step 507). Endpoint 101 may inform endpoint 102 that the selected framerate and resolution are all that endpoint 101 supports to ensure endpoint 102 only uses the selected framerate and resolution. Although, in some examples, endpoint 101 may merely encode video using the framerate and resolution to at least gain the power-saving benefits on the encoding side but not necessarily the decoding side as endpoint 102 may send video at a different framerate or resolution. In some examples, endpoint 101 may adjust the framerate and/or resolution after establishment of the communication session.

Figure 6:
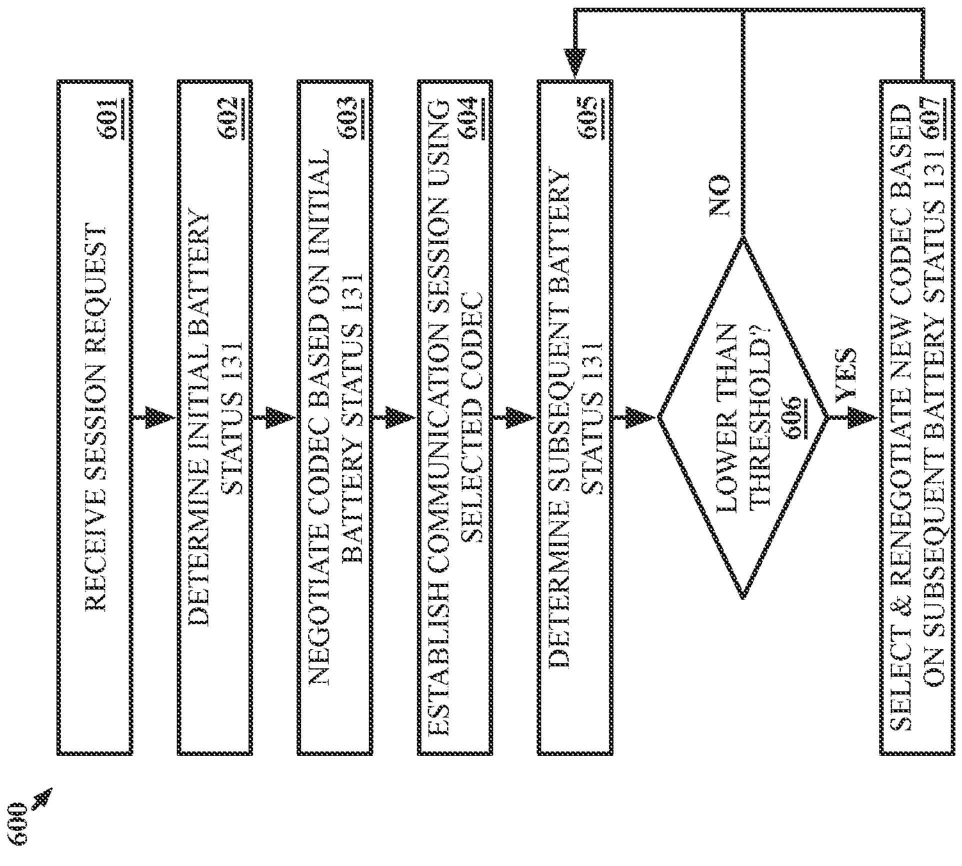
FIG. 6 illustrates an operation to consider a battery status of an endpoint when configuring a communication session.

FIG. 6 illustrates operation 600 to consider a battery status of an endpoint when configuring a communication session.

Operation 600 begins much like operations described above with endpoint 101 receiving a session request (step 601). Endpoint 101 determines an initial battery status 131 (step 602) and negotiates a codec with endpoint 102 based on the initial battery status 131 (step 603). That is, endpoint 101 determines codecs that will not run through what remains of the charge in battery 121, as indicated by battery status 131, before the session ends. Those determined codecs are offered to endpoint 102 during negotiation and one of the codecs is selected. Endpoint 101 establishes the communication session using the selected codec (step 604).

During the communication session, circumstances change for endpoint 101 and the communication session. For example, endpoint 101 may move to a new location or endpoint 101 may preemptively determine that endpoint 101 is moving towards a new location. In another example, endpoint 101 may determine that the communication session is running longer than originally estimated or is using more power than originally predicted. As such, endpoint 101 may determine a subsequent battery status 131 (step 605) and determine whether a battery charge level indicated by battery status 131 is lower than a low-power threshold (step 606). If the battery charge level is not lower, the communication session continues without modification and returns to step 605 to determine new battery status 131 for subsequent conditions for the communication session. If, however, the battery charge level is below the threshold, endpoint 101 selects a new codec(s) and renegotiates the codec for the communication session with endpoint 102 (step 607). Preferably, the renegotiation and switching of codecs occurs with little to no disruption to the user experience on the communication session.

In a particular example of operation 600, endpoint 101 may start the communication session at a location with a WIFI connection. At that time, endpoint 101 may determine the initial battery status 131 does not warrant selection of fewer than all possible codecs to offer endpoint 102 during negotiation. During the communication session, endpoint 101 may move to a different location away from WIFI and must instead use a cellular connection for the communication session. Cellular communications typically use more power than WIFI communications. Endpoint 101 initial determinations based on the power usage of WIFI are no longer valid. Therefore, endpoint 101 recalculates the power being used for the communication session and determines that battery 121 is not going to last the duration of the communication session (i.e., falls below the threshold). Endpoint 101 selects one or more codecs that use less power than the codec currently being used and renegotiates with endpoint 102 to use one of the lower-power codecs instead.

In some examples, multiple thresholds may exist. For instance, endpoint 101 may initially determine based on one threshold that a first codec can be used for the communication session. Then, upon determining that the communication session is lasting longer than first estimated, a second threshold indicates that a second, lower-power codec will be needed to make battery 121 last until the end of the communication session. Endpoint 101 will then renegotiate for the lower codec.

Figure 7:
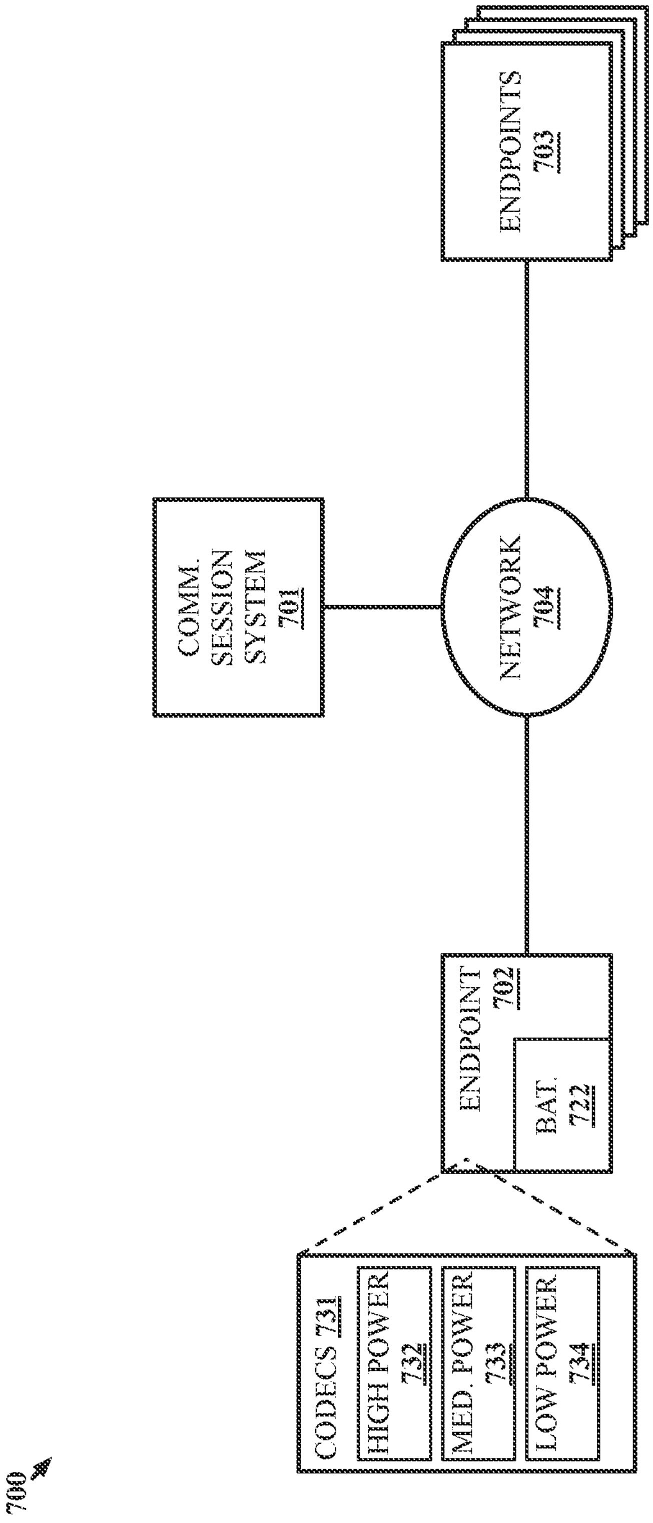
FIG. 7 illustrates an implementation for considering a battery status of an endpoint when configuring a communication session.

FIG. 7 illustrates implementation 700 for considering a battery status of an endpoint when configuring a communication session. Implementation 700 includes communication session system 701, endpoints 702-703, and communication network 704. Communication network 704 may include one or more local area networks, wide area networks (e.g., the Internet), or other types of communication links, systems, and devices—including combinations thereof. Endpoint 702 is shown to be powered by battery 722 but one or more of endpoints 703 may also be battery powered.

In operation, communication session system 701 facilitates communication sessions between endpoints 702-703. Communication session system 701 may be a conferencing server that provides a conference bridge for videoconferences. In this example, to host a communication session between endpoints 702-703, communication session system 701 establishes individual communication sessions with each of endpoints 702-703. Communication session system 701 aggregates the user communications (e.g., audio and video of participants at endpoints 702-703) before sending the aggregated communications over communication network 704 to endpoints 702-703. The individual sessions enable different codecs, or other parameters, to be used with different ones of endpoints 702-703. All of endpoints 702-703, therefore, do not need to have overlapping codecs supported to communicate via communication session system 701. Also, endpoint 702 can select codecs/parameters that use less power from battery 722 while not requiring other endpoints 703 to also use the same codec/parameters. For instance, endpoints 703 may communicate with higher-quality video using higher quality, more power-hungry codecs/parameters with video from endpoint 702 using less power-hungry codec/parameters. In this example, endpoint 702 supports codecs 731, which are codecs for video communications. Endpoint 702 also supports audio codecs that, while not discussed, may also be selected based on their power consumption characteristics.

Figure 8:
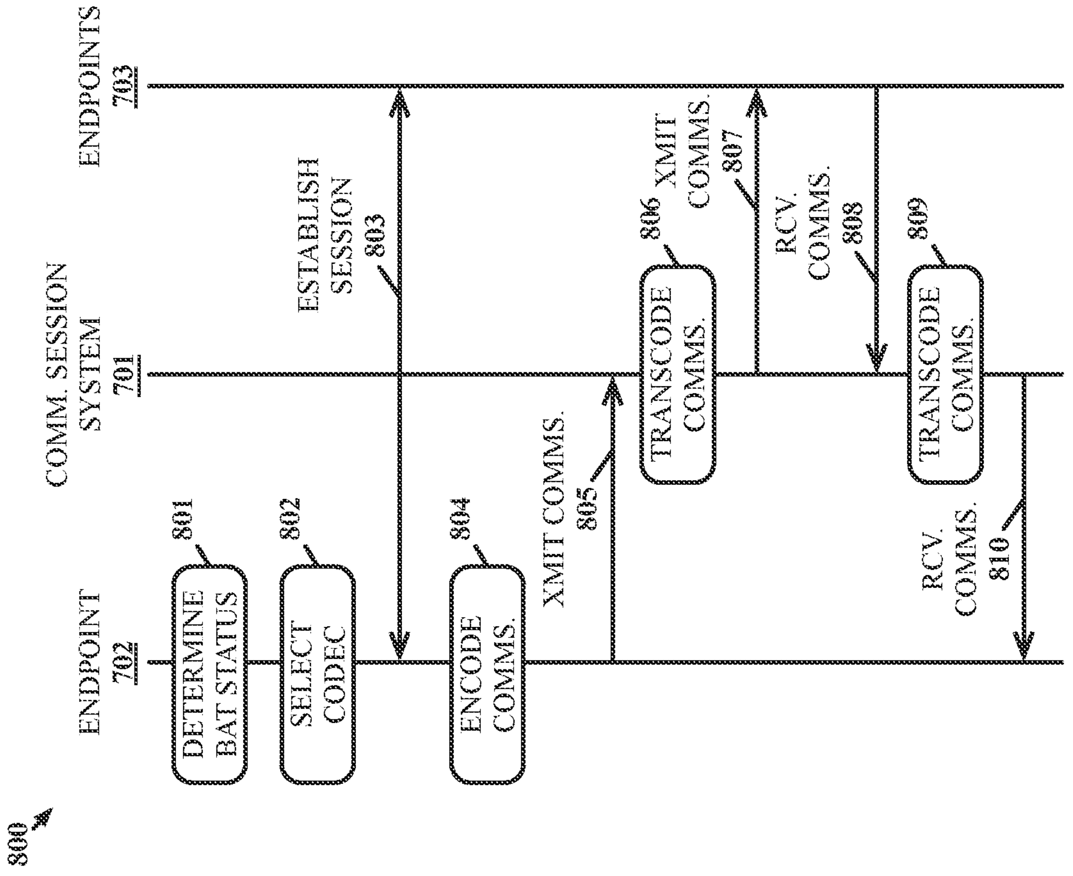
FIG. 8 illustrates an operational scenario for considering a battery status of an endpoint when configuring a communication session.

FIG. 8 illustrates operational scenario 800 for considering a battery status of an endpoint when configuring a communication session. Operational scenario 800 begins near the time when a videoconference session hosted by communication session system 701 is scheduled to begin between endpoints 702-703. Endpoint 702 determines a battery status of battery 722 (step 801). The battery status is used as a basis for selecting one of codecs 731 (step 802). Codecs 731 include high power codec 732, medium power codec 733, and low power codec 734, which are named as such due to high power codec 732 being a higher power consumption codec than medium power codec 733 and low power codec 734. Likewise, medium power codec 733 is a higher power consumption codec than low power codec 734. If the battery status of battery 722 indicates that battery 722 has enough power remaining to handle the entirety of the videoconference session (e.g., as indicated by a calendar entry for the videoconference) regardless of codec selected, endpoint 702 may select high power codec 732 because endpoint 702 is a higher quality codec (and/or uses less bandwidth). However, if high power codec 732 is too power hungry to last the entire session (or last until a buffer charge amount is reached), then endpoint 702 may select medium power codec 733 or low power codec 734 depending on which is more likely to consume an amount of power from battery 722 that allows endpoint 702 to remain powered until the end of the session.

After selecting one of codecs 731, the videoconference session is established through communication session system 701 (step 803). Each individual endpoint of endpoints 702-703 negotiates a session connection with communication session system 701 when establishing the videoconference session. Each negotiation includes a negotiation regarding which codec will be used between the endpoint and communication session system 701. In the case of endpoint 702, endpoint 702 negotiates based on the codec selected above. Endpoint 702 may only offer a single selected codec or may offer all codecs that will still work for the communication session based on the determined battery status of battery 722. For instance, if endpoint 702 determines high power codec 732 will work for the communication session, endpoint 702 may offer all of codecs 731 during codec negotiation. If endpoint 702 determines medium power codec 733 is the highest-powered codec that will work, endpoint 702 may only offer medium power codec 733 and low power codec 734 during the codec negotiation. In all likelihood, communication session system 701 will also select the highest-powered codec offered by endpoint 702 but communication session system 701 may have reason not to select the highest-powered codec (e.g., communication session system 701 may be under high load, so reducing computational load may be desired).

After establishing the communication session, communication session system 701 encodes video communications captured by endpoint 702 of a participant operating endpoint 702 (step 804). The encoded communications are transmitted to communication session system 701 (step 805), which transcodes the communications into one or more codecs used for the session connections established with endpoints 703 (step 806). The transcoded communications are transmitted over the session connections to endpoints 703 (step 807). Since steps 804-807 occur during a real-time videoconference session, steps 804-807 happen in real time continuously during the communication session to provide live video of the participant at endpoint 702.

Concurrently with steps 804-807, communication session system 701 receives video communications from endpoints 703 encoded with whichever codec(s) are used for the session connections established with endpoints 703 (step 808). The received communications are transcoded to the codec selected for the session connection with endpoint 702 (step 809). Endpoint 702 receives the transcoded communications and decodes the communications for display to the participant at endpoint 702 (step 810). Like steps 804-807, steps 808-810 occur continuously in real time to provide live video of participants at endpoints 703 during the videoconference. If at any point during the videoconference session, endpoint 702 determines the battery charge level of battery 722 necessitates a codec change to make it to the end of the session, endpoint 702 may renegotiate its session connection with communication session system 701. The session connections between endpoints 703 and communication session system 701 would remain unaffected.

Figure 9:
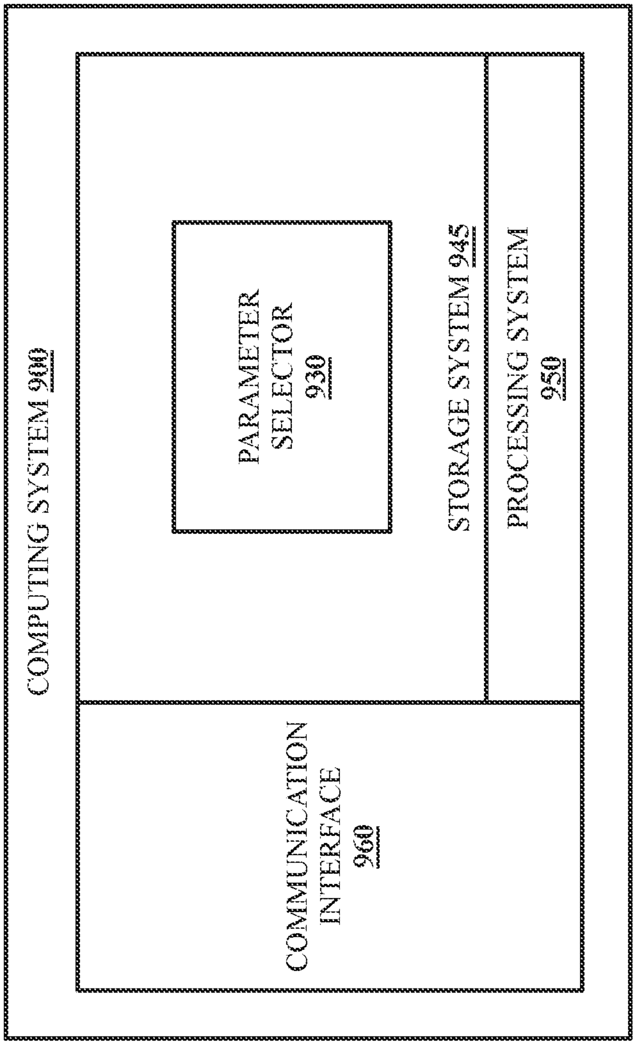
FIG. 9 illustrates a computing system for considering a battery status of an endpoint when configuring a communication session.

FIG. 9 illustrates computing system 900 for considering a battery status of an endpoint when configuring a communication session. Computing system 900 is representative of any computing system or systems with which the various operational architectures, processes, scenarios, and sequences disclosed herein can be implemented. Computing system 900 is an example architecture for endpoints 101-102 and 702-702 and communication session system 701, although other examples may exist. Computing system 900 includes storage system 945, processing system 950, and communication interface 960. Processing system 950 is operatively linked to communication interface 960 and storage system 945. Communication interface 960 may be communicatively linked to storage system 945 in some implementations. Computing system 900 may further include other components such as a battery and enclosure that are not shown for clarity.

Communication interface 960 comprises components that communicate over communication links, such as network cards, ports, radio frequency (RF), processing circuitry and software, or some other communication devices. Communication interface 960 may be configured to communicate over metallic, wireless, or optical links. Communication interface 960 may be configured to use Time Division Multiplex (TDM), Internet Protocol (IP), Ethernet, optical networking, wireless protocols, communication signaling, or some other communication format—including combinations thereof. Communication interface 960 may be configured to communicate with one or more web servers and other computing systems via one or more networks.

Processing system 950 comprises microprocessor and other circuitry that retrieves and executes operating software from storage system 945. Storage system 945 may include volatile and nonvolatile, removable, and non-removable media implemented in any method or technology for storage of information, such as computer readable instructions, data structures, program modules, or other data. Storage system 945 may be implemented as a single storage device but may also be implemented across multiple storage devices or sub-systems. Storage system 945 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no interpretations would storage media of storage system 945, or any other computer-readable storage medium herein, be considered a transitory form of signal transmission (often referred to as "signals per se"), such as a propagating electrical or electromagnetic signal or carrier wave.

Processing system 950 is typically mounted on a circuit board that may also hold the storage system. The operating software of storage system 945 comprises computer programs, firmware, or some other form of machine-readable program instructions. The operating software of storage system 945 comprises parameter selector 930. The operating software on storage system 945 may further include an operating system, utilities, drivers, network interfaces, applications, or some other type of software. When read and executed by processing system 950, the operating software on storage system 945 directs computing system 900 to display indicators in a participant list that convey visually discernable sentiments of the participants identified therein as described herein.

In at least one example, parameter selector 930 directs processing system 950 to determine a battery level of a battery powering the apparatus and select one or more codecs for a communication session based on the battery level. Parameter selector 930 further directs processing system 950 to negotiate a session codec from the one or more codecs with other endpoints to the communication session and establish the communication session using the session codec on user communications exchanged over the communication session.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for establishing a communication session based on endpoint battery status, the method comprising:
- in an endpoint being powered by a battery:
  - identifying a request to establish a communication session with the endpoint;
  - determining a battery status of the battery;
  - in response to determining the battery status satisfies a low-power criterion:
    - creating estimates for how long the battery will last using various combinations of one or more of a plurality of possible parameters;
    - estimating a length of the communication session; and
    - selecting, based on the estimates and the length of the communication session, one or more parameters of the plurality of possible parameters for the communication session that result in lower power usage relative to non-selected parameters of the plurality of possible parameters; and
  - establishing the communication session using the one or more parameters.

2. The method of claim 1, wherein the one or more parameters include an audio codec for exchanging audio user communications over the communication session, wherein use of the audio codec by the endpoint consumes less power than use of another audio codec in the non-selected parameters.

3. The method of claim 1, wherein the one or more parameters include a video codec for exchanging video user communications over the communication session, wherein use of the video codec by the endpoint consumes less power than use of another video codec in the non-selected parameters.

4. The method of claim 1, wherein establishing the communication session comprises:
- during a handshake process between the endpoint and a second endpoint to the communication session, negotiating session parameters with the second endpoint, wherein the session parameters include a selection of the one or more parameters.

5. The method of claim 4, wherein the session parameters do not include any of the non-selected parameters.

6. The method of claim 4, wherein the handshake process is defined by Session Initiation Protocol (SIP).

7. The method of claim 1, comprising:
- in response to determining the battery status satisfies a low-power criterion, selecting a wireless communication link for the communication session that uses less power than another wireless communication link, wherein the communication session is established over the wireless communication link.

8. The method of claim 1, wherein estimating the length of the communication session comprises:
- identifying a calendar entry for the communication session; and
- estimating the length of the communication session to be an amount of time defined in the calendar entry.

9. The method of claim 1, wherein estimating the length of the communication session comprises:
- identifying a second endpoint to the communication session;
- determining lengths of past communication sessions with the second endpoint; and
- estimating the length of the communication session based on the lengths of the past communication sessions.

10. The method of claim 1, wherein selecting the one or more parameters comprises:
- presenting a user with estimates of how long the battery will last with different parameter combinations; and
- receiving a selection from the user of the one or more parameters from the different parameter combinations.

11. The method of claim 1, comprising:
- determining the endpoint is moving to a new location from a current location; and
- determining one or more wireless communication links available at the new location, wherein the one or more parameters are selected based on the one or more wireless communication links available at the new location.

12. The method of claim 1, wherein the low-power criterion comprises a threshold battery level higher than a second threshold battery level, wherein different ones of the plurality of possible parameters are selected when the second threshold battery level is reached.

13. The method of claim 12, comprising:
- after establishing the communication session, determining the battery status indicates the battery has depleted to reach the second threshold battery level; and
- renegotiate the communication session using the different ones of the plurality of possible parameters.

14. A apparatus for establishing a communication session based on endpoint battery status, the apparatus comprising:
- one or more computer readable storage media;
- one or more processing systems operatively coupled with the one or more computer readable storage media; and
- program instructions stored on the one or more computer readable storage media that, when read and executed by the one or more processing systems, direct the apparatus to:
  - determine a battery level of a battery powering the apparatus;
  - create estimates for how long the battery will last at the battery level using various combinations of one or more of a plurality of possible parameters;
  - estimating a length of a communication session;
  - select one or more codecs for the communication session based on the estimates and the length of the communication session;
  - negotiate a session codec from the one or more codecs with other endpoints to the communication session; and
  - establish the communication session using the session codec on user communications exchanged over the communication session.

15. The apparatus of claim 14, wherein to select the one or more codecs, the program instructions direct the apparatus to:
- determine a first codec will deplete the battery faster than a second codec; and
- include the first codec, but not the second codec, in the one or more codecs.

16. The apparatus of claim 14, wherein the program instructions direct the apparatus to:
- select configuration parameters for the session codec based on the battery level.

17. The apparatus of claim 16, wherein the session codec is a video codec, wherein the configuration parameters include a framerate and resolution for video user communications, and wherein a lower framerate and a lower resolution are selected when the battery level is below a threshold relative to a higher framerate and a high resolution when the battery level is above the threshold.

18. The apparatus of claim 14, wherein the session codec is an audio codec, wherein to select the one or more codecs, the program instructions direct the apparatus to:

select a first audio codec that will deplete the battery slower than a second audio codec when the battery level satisfies a low-power criterion.

19. One or more computer readable storage media having program instructions stored thereon for establishing a communication session based on endpoint battery status, the program instructions, when read and executed by a processing system, direct the processing system to:

receive a request from a user of a first endpoint to initiate a communication session with a second endpoint;

determine a battery level of a battery powering the first endpoint;

create estimates for how long the battery will last at the battery level using various combinations of one or more of a plurality of possible parameters;

estimate a length of a communication session;

select one or more codecs for the communication session based on the estimates and the length of the communication session;

use Session Initiation Protocol (SIP) to negotiate a session codec from the one or more codecs with other endpoints to the communication session; and establish the communication session using the session codec on user communications exchanged.

* * * * *